United States Patent
De Jongh et al.

(10) Patent No.: US 11,979,958 B2
(45) Date of Patent: May 7, 2024

(54) POWER REDUCTION FOR RADAR-BASED MOTION DETECTION SYSTEMS AND METHODS

(71) Applicant: SIGNIFY HOLDING B.V., Eindhoven (NL)

(72) Inventors: Frits Tobi De Jongh, Beek en Donk (NL); Fetze Pijlman, Eindhoven (NL); Christian Hattrup, Wurselen (DE); Haimin Tao, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 271 days.

(21) Appl. No.: 17/634,970

(22) PCT Filed: Aug. 7, 2020

(86) PCT No.: PCT/EP2020/072229
§ 371 (c)(1),
(2) Date: Feb. 12, 2022

(87) PCT Pub. No.: WO2021/028332
PCT Pub. Date: Feb. 18, 2021

(65) Prior Publication Data
US 2022/0295621 A1    Sep. 15, 2022

(30) Foreign Application Priority Data
Aug. 15, 2019  (EP) .................................... 19191902

(51) Int. Cl.
*H05B 47/115*    (2020.01)
*G01S 13/56*     (2006.01)
(Continued)

(52) U.S. Cl.
CPC ............ *H05B 47/115* (2020.01); *G01S 13/56* (2013.01); *G01S 13/88* (2013.01); *H05B 47/19* (2020.01)

(58) Field of Classification Search
None
See application file for complete search history.

(56) References Cited

U.S. PATENT DOCUMENTS

| | | | | |
|---|---|---|---|---|
| 7,394,877 B2 * | 7/2008 | Williams | ............ | H04W 52/029 375/316 |
| 2007/0052578 A1 * | 3/2007 | Ramakrishnan | ........ | G01S 7/415 342/90 |

(Continued)

FOREIGN PATENT DOCUMENTS

| | | |
|---|---|---|
| CN | 108006317 A | 5/2018 |
| GB | 2506671 A | 4/2014 |

(Continued)

OTHER PUBLICATIONS

M. Otero, "Application of a Continuous Wave Radar for Human Gait Recognition", Visual Communications and Image Processing, vol. 5809, No. 1, May 1, 2005, pp. 538-548.

(Continued)

*Primary Examiner* — Srinivas Sathiraju

(57) ABSTRACT

Radar-based motion detection systems are widely used in smart home, smart building, and smart city area for automatic control. In this invention, methods, subsystem, systems, computer program are disclosed to achieve power reduction of a radar sensor by operating the radar sensor in a sub-sampling manner in an illumination control system. By combining the information related to the detection area and the state of a lighting device, the sampling frequency of a radar sensor is configured according the user scenario. A (Continued)

balance between power reduction and motion detection performance is achieved therefrom.

15 Claims, 5 Drawing Sheets

(51) Int. Cl.
  *G01S 13/88* (2006.01)
  *H05B 47/19* (2020.01)

(56) References Cited

U.S. PATENT DOCUMENTS

| | | | | |
|---|---|---|---|---|
| 2007/0171407 | A1* | 7/2007 | Cole | G01J 3/4338 |
| | | | | 356/300 |
| 2007/0223936 | A1* | 9/2007 | Babbitt | G01J 9/04 |
| | | | | 398/182 |
| 2008/0071136 | A1* | 3/2008 | Oohashi | G10H 7/00 |
| | | | | 600/27 |
| 2016/0022141 | A1* | 1/2016 | Mittal | H03M 1/128 |
| | | | | 340/870.07 |
| 2016/0345406 | A1 | 11/2016 | Donhowe et al. | |
| 2017/0303370 | A1* | 10/2017 | Pijlman | H05B 47/155 |
| 2017/0353189 | A1* | 12/2017 | Chen | H03L 7/091 |
| 2018/0172815 | A1 | 6/2018 | Mckitterick | |
| 2021/0168920 | A1* | 6/2021 | Shi | G01S 17/50 |
| 2022/0022303 | A1* | 1/2022 | Khan | G01S 13/56 |
| 2022/0295621 | A1* | 9/2022 | De Jongh | G01S 13/88 |

FOREIGN PATENT DOCUMENTS

| | | |
|---|---|---|
| JP | 2010007263 A | 1/2010 |
| JP | 2010049938 A | 3/2010 |
| JP | 2011196069 A | 10/2011 |
| JP | 2013204323 A | 10/2013 |
| JP | 2018168530 A | 11/2018 |
| WO | 2014191712 A1 | 12/2014 |

OTHER PUBLICATIONS

Branka Jokanovic, et al., "Multi-Window Time-Frequency Signature Reconstruction from Undersampled Continuous-Wave Radar Measurements for Fall Detec", IET Radar Sonar Navigation, the Institute of Engineering and Technology, UK, vol. 9, No. 2, Feb. 1, 2015, pp. 173-183.

* cited by examiner

POWER REDUCTION FOR RADAR-BASED MOTION DETECTION SYSTEMS AND METHODS

CROSS-REFERENCE TO PRIOR APPLICATIONS

This application is the U.S. National Phase application under 35 U.S.C. § 371 of International Application No. PCT/EP2020/072229, filed on Aug. 7, 2020, which claims the benefit of European Patent Application No. 19191902.6, filed on Aug. 15, 2019. These applications are hereby incorporated by reference herein.

FIELD OF THE INVENTION

The present invention is directed generally to a radar-based motion detection system used for control, for example lighting control. More particularly, various methods, subsystem, systems and computer-readable media are disclosed herein related to motion-detection based illumination control systems and methods.

BACKGROUND OF THE INVENTION

Mains power standby consumption becomes a more and more important feature for many products. Certain new products have to comply to national and international standards and regulations on standby power consumption requirements, which also become stricter with time.

For lighting applications, it becomes more and more common that sensor systems are employed to achieve automatic lighting control with better energy efficiency, improved user experience and comfort level. When a lighting device is in a standby mode, associated sensor systems are still running to carry out some control functions, such as to detect certain events to turn on the light in time. The power consumption of the sensor systems, when the lighting device is in a standby mode, adds up to the mains power standby consumption of the lighting device.

Furthermore, there is an increasing need for adding more functionalities to the lighting devices. Some of the functions operate during both the standby mode and the active mode of the lighting devices, e.g. a RF link for remote control and occupancy sensing. Currently, radar systems for occupancy detection are penetrating the market. A technique for power reduction of a radar system is power cycling, where the supply power to the radar system is switched-on and switched-off repeatedly when possible. Power consumption of a radar sensor is decreased in part because of the reduction of the duty cycle. The minimum duty cycle of the radar sensor is typically determined by the requirement on a maximum response time of the system.

Digital Addressable Lighting Interface (DALI) is a standard communication protocol and a network-based system for lighting control. A DALI system is specified by the technical standards IEC 62386 and IEC 60929. To cater for the application needs of the Internet of Things (IoT) in the lighting area, the DALI protocol is also evolving, and the new DALI sensor-ready (SR) interface as standardized by ANSI C137.4, which integrates power supply to the sensors connected on the bus and allows for digital two-way communication at the same time. However, the maximum supply current that can be drawn from a DALI bus is limited by the DALI SR specification, which is typically up to 250 mA. Therefore, next to the mains power consumption, when sensor systems are connected to a DALI SR interface. The total power consumption of a multi-sensor systems is also limited by the DALI SR specification.

US2007052578A1 discloses a method that identifies a moving object by first transmitting a signal at a predetermined frequency. An unknown object reflects the signal, and the reflected signal is detected. Frequencies of the reflected signal are modulated according to motion of the unknown object. General features are extracted from the reflected signal, and the features are used by a statistical classifier to identify the unknown object.

US2017353189A1 is related to a subsampling motion detector that is configured to detect motion information of an object under measurement receives a first wireless radio frequency (RF) signal and transmits a second wireless RF signal, the first wireless RF signal being generated by reflecting the second wireless RF signal from the object.

B. Jokanovic, M. G. Amin, Y. D. Zhang and F. Ahmad, "Multi-window time-frequency signature reconstruction from undersampled continuous-wave radar measurements for fall detection," in IET Radar, Sonar & Navigation, vol. 9, no. 2, pp. 173-183, 2 2015, discloses a hybrid approach of applying compressive sensing and multi-window analysis based on Slepian or Hermite functions for fall detection and classification in case of full data or compressed observations.

SUMMARY OF THE INVENTION

In view of the above, the present disclosure is directed to methods, subsystem, systems, computer program and computer-readable media for further reducing the power consumption of sub radar sensor systems by sub-sampling in a lighting control scenario. More particularly, various computer-readable media (transitory and non-transitory), methods, systems and subsystem are provided to reduce the sampling frequency of the radar sensor to a certain level, which is sufficient to meet the application requirements pertained to a corresponding state of a lighting device.

Radar is a well-known detection system that uses radio waves to determine the distance, angle, or velocity of moving objects. A radar system works by radiating energy into space and monitoring the echo or reflected signals from the objects in the surround area, or the detection area. Typically, A radar system has a transmitter that emits radio waves, or radar signals, into space in predetermined directions. When the radar signals come into contact with an object, they are usually reflected back or scattered in many directions, depending on the material and surface of the object and also the injection angles of the radar signals. Some of the radar signals penetrate into the target or are absorbed by the target, to certain levels. Some of the radar signals that are reflected back towards the radar system are captured by a receiver in the radar system, which are the desirable ones that make the radar system work. If an object is moving either toward or away from the transmitter in the detection area, there is a corresponding change in the frequency of the reflected radio waves, caused by the Doppler effect. In a simple example, by comparing the frequency shifts between the emitted signals and the received echoes from the detection area, the radar system can derive the relative speed between the radar system and the moving object based on the Doppler effect. In addition to speed measurement, distance from a moving target and orientation of the moving target can also be derived. Depending on the operation mechanism, different methods may be used to derive a certain type of information. For a pulse radar, distance measurement can be based on the time-of-flight principle, whereas for a continuous wave radar the frequency shift of the received signal as compared to the transmitted signal is proportional to the distance travelled. An orientation of a moving target with regard to the radar sensor may be derived by employing certain kinds of antennas or antenna array.

In a more practical scenario, the echoes received by the radar system may be a mixed signal resulted from more than one moving objects. Furthermore, due to the different surfaces of the multiple moving objects and different injection angles of the emitted signals from the radar system relative to each of the multiple objects, the echoes captured at the radar system is a hybrid signal including directly reflected signals and also scattered signals, which may travel along several surfaces, of a static object or another moving object, to bounce back to the radar system. Different echoes are combined either constructively or destructively at the receiver antenna of the radar system. Therefore, the signal processing can be quite complicated and also power consuming in a radar system.

As one of the modern uses of a radar system, radar sensing based presence detection is widely used for automatic control in smart building and smart city scenarios. Presence detection can be as simple as to provide a binary information to indicate the presence of a person or a moving object in the detection area. It can also be more sophisticated, such as to provide detailed motion information of the number of objects in the detection area, locations of the objects, trajectories of the objects, and even coarse or fine classification of the motion involved.

In the lighting control context, more advanced radar sensing capabilities are desirable, but it may contradict to the power consumption requirements. Therefore, the invention is targeted to reduce the power consumption of a radar sensor by operating the sensor in a sub-sampling mode when possible, and to make the sampling frequency adaptive to the state of the lighting device and the application scenario.

For the ease of description, two operation states are defined for a lighting device: a standby mode and an active mode. The standby mode of a lighting device includes the situation that the lamp is off, or the lamp is at a minimum dimming level, e.g. ≤10%. The active mode of a lighting device includes the situation that the lamp is at full output, or in a dimmed state, with a dimming level >10%. However, such definition is only for illustration purpose, and it does not exclude other possibilities in setting a different dimming level to distinguish the states, such as to set a minimum dimming level to 5% or 15%.

In accordance with a first aspect of the invention a subsystem for controlling illumination of a lighting device via motion detection is provided, the subsystem comprising: a radar sensor configured to detect motion in a detection area by sampling derived signals from the detection area at a sampling frequency; a controller communicatively coupled to the radar sensor and the lighting device, the controller configured to set the sampling frequency of the radar sensor when the lighting device is in a standby mode to an initial value below two times a first Nyquist frequency and control the lighting device based on sensor data obtained by the radar sensor at the specified sampling frequency; and wherein the first Nyquist frequency is set to a first estimated maximum Doppler frequency of motion to be detected in the detection area by the radar sensor when the lighting device is in the standby mode.

As introduced above related to the operation principle of a radar system, a radar sensor works by comparing the frequency shifts between the emitted signals and the received echoes from the detection area. The derived signals from the detection area, as claimed, are down converted signals by mixing the reflected signals from the detection area with the originally emitted radar signals, which are known to the radar sensor. Therefore, the derived signals correspond to the baseband signals in the radar sensor ready for sampling by an analog to digital converter (ADC).

For a typical digital signal processing system, the sampling frequency of the ADC should be at least two times the Nyquist frequency in order to reconstruct the original signal, according to the Nyquist sampling criterion. The power consumption of the ADC and the following digital processing circuit are in proportion to the sampling frequency.

Advantageously, by setting the sampling frequency to an initial value below two times the first Nyquist frequency, the power consumption of the radar sensor is reduced by operating in a sub-sampling mode. The penalty is that aliasing may be present due to sub-sampling, which will result in distortion of the signals.

For a Doppler radar, the signal bandwidth of the baseband signal is equivalent to the Doppler shift. Although it can be quite complicated to precisely derive the actual Doppler shift, which depends on many factors related to the moving objects and also the environment, a rule of thumb estimation of the maximum Doppler shift can be made according to the detection area and the type of motions to be detected in the detection area.

It is more advantageous that the first Nyquist frequency is tailored not only to the detection area, but also to the state of the lighting device. For example, in the indoor environment, when the lamp is in a standby mode, it typically indicates there is no person in the area. And hence, the motion to be detected by the radar sensor at the first moment when the lighting device is in a standby mode are typically big motions, such as a person entering the room. In contrast, when the lighting device is in an active mode, which typically indicates there is a person already in the room, most of the time the radar sensor may only detect minor motions of the person, such as typing on a keyboard or talking on a phone. Since the Doppler shifts resulted from big motions and minor motions can differ quite a lot, a more accurate estimation of the first Nyquist frequency in accordance with the to be detected motion can thus be made by taking into account the state of the lighting device and the detection area. It reduces the chance that the sampling frequency is set unnecessarily high leading to extra power consumption.

Furthermore, when the lighting device is in a standby mode, in order to turn on the lamp in time it is more important to detect if there is any motion in the detection area, other than to derive detailed motion information. Therefore, the radar sensor is allowed to provide only a basic binary presence detection. The processing of the radar sensor for a binary presence detection is similar to an energy detector in the baseband, and hence distortion to the Doppler shift caused by sub-sampling will not result in performance degradation to the system. Operating in a sub-sampling mode with the sampling frequency below two times the first Nyquist frequency, the power consumption of the radar can be reduced significantly, which may be a quite favorable feature for lighting control in a standby mode.

Advantageously, motion detection can be done by processing signals sampled at a sampling frequency and obtained from a radar sensor, and wherein the radar sensor sampling derived signals from the detection area at the sampling frequency. The processed signals are provided as sensor data for a further control purpose.

Preferably, the subsystem is comprised in a luminaire, and the controller, which is communicatively coupled to the radar sensor and the lighting device, is used for the control of both motion detection and illumination. In one example, a lamp/luminaire may comprise an integrated radar sensor in the same housing as the lighting device.

Alternatively, the subsystem is not comprised in a luminaire, and the radar sensor, the lighting device, and the controller are physically distributed. Via the controller, which is communicatively coupled to the radar sensor and the lighting device, the sensor data from the radar sensor and the state information of the lighting device can be exchanged to each other via the controller. Thus, the lighting device may have another local controller for lighting control, and the radar sensor may have another processor for local signal processing. In that sense, the controlling of both motion detection and illumination are distributed between the controller comprised in the subsystem and individual local controller or processor.

Advantageously, the initial value of the sampling frequency is set below the first Nyquist frequency.

Since the power consumption of the radar sensor scales with the sampling frequency and the binary presence detection when the lamp is in standby mode is not vulnerable to distortion resulted from aliasing, it is desirable to further reduce the sampling frequency to below the first Nyquist frequency in a deep sub-sampling mode that saves more energy.

In one embodiment, the controller is further configured to generate a control signal to trigger the lighting device to change from the standby mode to an active mode when motion is detected from sensor data obtained by the radar sensor.

By detecting Doppler shifts in the reflections from the detection area as compared to the originally emitted radar signals, motion can be confirmed. In the binary presence detection, if energy is detected in the baseband bandwidth, it also confirms the presence in the detection area. The processing can be done in the local processor of the radar sensor itself. It can also be done in the controller comprised in the subsystem, in case the radar sensor does not comprise a local processor or it is determined to be more efficient to carry out the calculation in the controller comprised in the subsystem. The control signal is generated according to the confirmation of the presence detection, and hence to trigger the state change of the lighting device from a standby mode to an active mode.

Preferably, the subsystem comprises a wireless transceiver, and the wireless transceiver is configured to transmit sensor data and/or the control signal wirelessly to at least one of: the lighting device, a remote-control device, and a smart electronic device belonging to a user.

When the subsystem is of a distributed nature, and the radar sensor, the controller and the lighting device are not co-located in one luminaire, it is advantageous to use wireless transceivers to enable the connection. Preferably, the sensor data from the radar sensor and the control signal generated thereof can also be shared wirelessly to a remote-control device for other control purposes other than lighting control, such as the control of entrance, HVAC, blinds, and etc. The same sensor data and control signal can also be shared with a user remotely via a smart electronic device, such as a smart phone or a wearable device with wireless communication capability. For one example, the owner can have real time occupancy or intrusion information of his house when he is at work or traveling around.

Alternatively, when mobility is less critical, such connection may also be achieved via a wired link. For example, the controller is connected to the lighting device via a cable or a bus.

In another embodiment, the controller is further configured to determine an operation mode of the radar sensor to be either a normal operation mode or a power saving mode according to a power supply condition when the lighting device is in the active mode, set the sampling frequency of the radar sensor when the lighting device is in the active mode to: at least two times a second Nyquist frequency for the normal operation mode and below two times the second Nyquist frequency for the power saving mode, and wherein the second Nyquist frequency is set to a second estimated maximum Doppler frequency of motion to be detected in the detection area by the radar sensor when the lighting device is in the active mode.

As disclosed above, it is beneficial to tailor the Nyquist frequency to the combination of the state of the lighting device and the detection area. Given that when the lighting device is in an active mode, most of the time only minor motions with small amplitudes are present, and in order to detect those signals, the sampling frequency should be increased to get better signal to noise ratio. The selection of the second estimated Nyquist Doppler frequency is also a design tradeoff between power consumption and motion detection performance. Given potentially different power consumption requirements when the lighting device is in an active mode or a standby mode, it is beneficial to also decouple the settings of the sampling frequency of the radar sensor when the lighting device is in a different state.

Preferably, the radar sensor is operating in a normal operation mode by setting the sampling frequency higher than two times the second Nyquist frequency, when the lighting device is in active mode. If the lighting device is in an active mode, it typically indicates there is a person in the illumination area, and more advanced presence detection may be needed. In that sense, it becomes more important to derive the correct Doppler shifts of the motion involved in order to implement further radar processing. Therefore, the radar sensor is no longer operating in sub-sampling mode. Furthermore, when the lighting device is in an active mode, the power consumption requirement is less critical for the radar sensor, given the contribution of the power consumption of a radar sensor to the entire system. In some scenarios, when the power consumption of the radar sensor may be not critical anymore, the sampling frequency can be even several times higher than the second Nyquist sampling frequency, and hence the motion detection can benefit from an over-sampling gain.

However, when the radar sensor is powered by a DALI SR interface and is sharing the same bus with several other sensors, it may be still desirable for the radar sensor to stay in a power-saving mode. In that case, the sampling frequency of the radar sensor will be below two times the second Nyquist frequency in a sub-sampling mode. And then, the sampling frequency can be set slightly below two times the second Nyquist frequency, or further below two times the second Nyquist frequency, adaptively to the actual power supply condition.

Advantageously, the controller is further configured to: derive detailed motion information via Doppler analysis based on samples of sensor data obtained by the radar sensor when motion is detected, and wherein the detailed motion information includes at least one of: a number of motion sources, a distance from a motion source to the radar sensor, an orientation of a motion source relative to the radar sensor, a moving direction of a motion source relative to the radar sensor, velocity of the motion, and classification of the motion; control the lighting device in a more advanced mode according to the detailed motion information.

With detailed motion detection based on Doppler analysis or micro-Doppler analysis, more sophisticated presence information can be derived. Such detailed motion information can enrich the lighting control to a more advanced level, such as to switch the lighting device to a certain scene based on the classification of the motion. For example, if the motion detection derives that the person is lying on a sofa, the controller may send a control signal to trigger the lighting device to switch to a relaxing scene. In another example, if the motion detection shows that the person is playing video games, the controller may send another control signal to trigger the lighting device to switch to a stimulating scene by manipulating the light spectrum in a different manner.

To avoid unnecessary power consumption on radar processing, the detailed motion information may be derived only for one or more dominant motion sources, which in practice are also the main factors in determining a lighting scene.

It is also disclosed that when no motion is detected by the radar sensor after a first predefined time period, the controller is further configured to generate another control signal to trigger the lighting device to change from the active mode to the standby mode. The first predefined time period can be determined according to a power-saving requirement in a green building context, or according to certain expectation on user experience.

The detailed motion information may also be sent to a remote-control device for other control purposes, or to a smart electronic device belonging to a user for more advanced monitoring.

In one embodiment, the radar sensor further comprises: an analog front-end, AFE, arranged to be separately powered on and off from the rest of the radar sensor; and the controller further configured to control the power cycle of the AFE of the radar sensor with the same frequency as the sampling frequency by turning on the AFE before a sampling moment for the radar sensor to take a sample and turning off the AFE once the sample is taken.

More advantageously, the sub-sampling operation can be used in combination with other power saving techniques for a radar sensor, such as power cycling. The AFE of the radar sensor can be subjected to duty cycling with a clock operating on the same frequency of the sampling clock, but with a slight phase shift, in order to guarantee a stable sampling operation of the radar sensor.

In an embodiment, a system for controlling illumination via motion detection, the system comprising: a subsystem according to the first aspect;
wherein the subsystem is configured to generate a control signal to: trigger the lighting device to change from the standby mode to the active mode when motion is detected, and trigger the lighting device to change from the active mode to the standby mode when no motion is detected after a first predefined time period.

Preferably, the system further comprising a remote-control device or a smart electronic device belonging to a user. The sensor data and/or the control signal may also be sent to the remote-control device or a smart electronic device belonging to a user for other controlling or monitoring purpose, other than purely lighting control. In another example, there may be other sensors collocated with the remote-control device or the smart electronic device belonging to a user. And hence, the radar sensor comprised in the subsystem and other sensors may cooperate or coordinate remotely by sharing sensing data from different modalities.

It is further disclosed that the system comprises another lighting device. The subsystem is used to control the more than one lighting device in the system in a collective way.

In accordance with a first aspect of the invention a method for controlling illumination of a lighting device via motion detection is provided, the method comprising: detecting motion in a detection area by a radar sensor, the radar sensor sampling derived signals from the detection area at a sampling frequency; setting the sampling frequency of the radar sensor when a lighting device is in a standby mode to an initial value below two times a first Nyquist frequency, and wherein the first Nyquist frequency is equal to a first estimated maximum Doppler frequency of motion to be detected in the detection area by the radar sensor when the lighting device is in the standby mode; controlling the lighting device based on sensor data obtained by the radar sensor at the specified sampling frequency.

Preferably, the method further comprising detecting motion by processing signals sampled at a sampling frequency and obtained from a radar sensor, and wherein the radar sensor sampling derived signals from the detection area at the sampling frequency. The processed signals are provided as sensor data for control purpose.

Advantageously, the method further comprising setting the initial value of the sampling frequency below the first Nyquist frequency.

In one embodiment, the method further comprising: generating a control signal to trigger the lighting device to change from the standby mode to an active mode when motion is detected from sensor data obtained by the radar sensor.

In another embodiment, the method further comprising: setting the sampling frequency of the radar sensor when the lighting device is in the standby mode to an increased value as compared to the initial value when a motion is detected from sensor data obtained by the radar sensor; generating a control signal to trigger the lighting device to change from the standby mode to the active mode when the detection of motion is confirmed from a new set of sensor data obtained by the radar sensor operating at the sampling frequency of the increased value; setting the sampling frequency back to the initial value when the detection of motion is not confirmed from the new set of sensor data obtained by the radar sensor operating at the sampling frequency of the increased value.

When the radar sensor operates in a deep sub-sampling mode, the false positive rate may increase. When the lighting device is turned on due to a false positive decision on the motion detection, it also introduces unwanted power consumption of the system. Therefore, it is preferable to use a further step to reduce the possibility of false positive. The controller will set the sampling frequency of the radar sensor to an increased value after motion is detected from the sensor data obtained by the radar sensor operating at the sampling frequency of the initial value. If motion is confirmed by the new set of sensor data obtained by the radar sensor operating at the sampling frequency of the increased value, a control signal to trigger the state change of the lighting device will be generated; otherwise, the controller will decide that it is a false positive and reset the sampling frequency of the radar sensor back to the initial value for power saving.

Advantageously, the method further comprises: sweeping the sampling frequency when the lighting device is in the standby mode to several different discrete sampling frequencies below two times the first Nyquist frequency, and setting the sampling frequency to each of the several different discrete sampling frequencies for a second predefined time period to enable a stable detection by the radar sensor; recovering motion-related Doppler frequency signals from aliasing, by comparing a set of subsampled outputs of sensor data obtained by the radar sensor sampled at each of the several different discrete sampling frequencies.

Although in most cases, only binary presence detection is expected for a radar sensor operating in sub-sampling mode. Sometimes, it is also desirable to derive some more information from the sub-sampling radar, such as the speed of the motion, the number of motion sources and etc. Motion-related Doppler frequency signals may still be recovered from aliasing by sweeping the sampling frequency to several different discrete sampling frequencies below two times the first Nyquist frequency, and comparing subsampled outputs of sensor data sampled at each of the several different discrete sampling frequencies. Sometimes, this method might take a longer time to derive wanted signals, and hence this approach represents a trade-off between latency and power consumption.

In one embodiment, the method further comprising: determining an operation mode of the radar sensor to be either a normal operation mode or a power saving mode according to a power supply condition when the lighting device is in the active mode; setting the sampling frequency of the radar sensor when the lighting device is in the active mode to: at least two times a second Nyquist frequency for the normal operation mode, and below two times the second Nyquist frequency for the power saving mode, and wherein the second Nyquist frequency is set to a second estimated maximum Doppler frequency of motion to be detected in the detection area by the radar sensor when the lighting device is in the active mode.

Preferably, the method further comprising: deriving detailed motion information via Doppler analysis based on sampled outputs of sensor data obtained by the radar sensor when motion is detected, and wherein the detailed motion information includes at least one of: a number of motion sources, a distance from a motion source to the radar sensor, an orientation of a motion source relative to the radar sensor, a moving direction of a motion source relative to the radar sensor, velocity of the motion, and classification of the motion; controlling the lighting device in a more advanced mode according to the detailed motion information.

It is also disclosed that the method may further comprise a step of: generating another control signal to trigger the lighting device to change from the active mode to the standby mode when no motion is detected by the radar sensor after a first predefined time period when the lighting device is in the active mode.

The invention may further be embodied in a computer program or a computer program product comprising code means for causing the computer to carry out the aforementioned methods of the subsystem for controlling illumination via motion detection.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

Employing a radar-based motion detection system to achieve automatic control is desirable for many control systems in different scenarios, such as a smart home, a smart building, and a smart city. Automatic control based on motion detection or presence detection makes the interaction between human beings and their surroundings more intuitive and spontaneous. Certain products, such as lighting devices, may have to comply with more and more strict regulation on standby power consumption. Since a sensor system operates also during the standby state of a lighting device, the power consumption of a sensor system adds up directly to the standby power consumption of the lighting device. And hence, it becomes critical to reduce the power consumption of a sensor system without degrading the control function.

Figure 1:
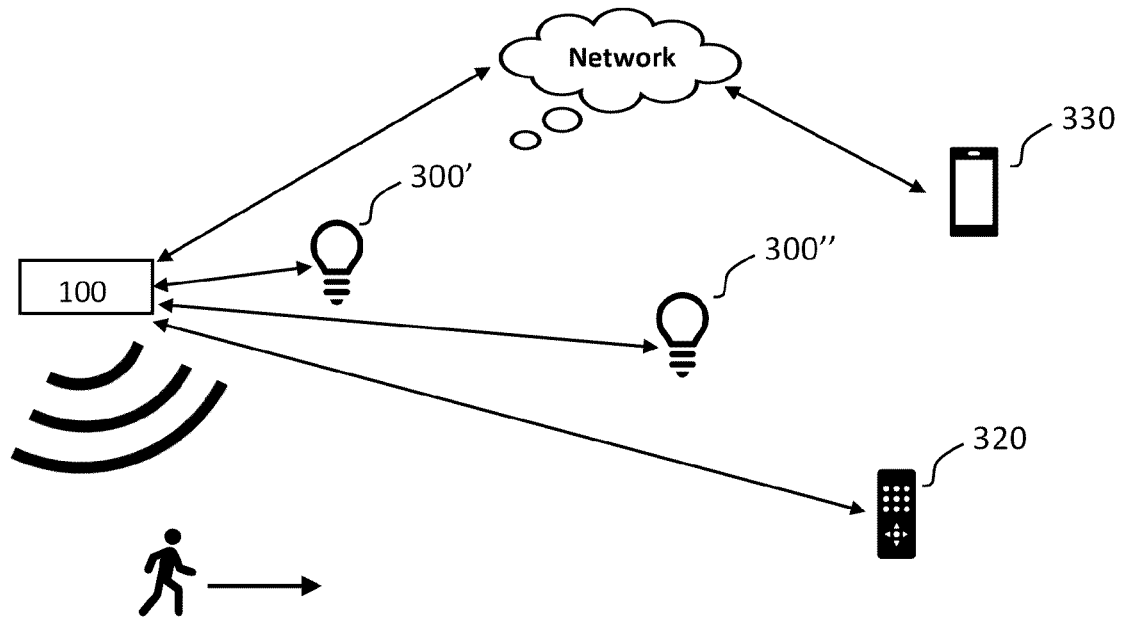
FIG. 1 shows an illustrative lighting control system based on motion detection.

FIG. 1 shows an example of a lighting control system based on motion detection, which includes a subsystem 100 as disclosed, and at least one lighting device 300', 300", and a remote-control device 320 and a smart electronic device 330 belong to a user. When a person is entering the detection area, the radar sensor comprised in the subsystem 100 will detect the motion, and then the subsystem may share sensor data and/or control signals derived from sensor data to several devices nearby, such as lighting devices 300', 300" and a remote-control device 320. It is also possible that the subsystem shares sensor data and or control signals via a network to a remote smart electronic device.

The lighting devices 300', 300" may be co-located with the subsystem 100 in the same area, such as in a same room or in close proximity and may be communicatively coupled to the subsystem wired or wirelessly. The subsystem also communicates wirelessly to the remote-control device, which may be employed for other control purposes other than lighting control, such as the control of entrance, HVAC, blinds, and etc. The same sensor data and control signal can also be shared with a user remotely via a smart electronic device, such as a smart phone or a wearable device with wireless communication capability. For one example, the owner can have real time occupancy or intrusion information of his house when he is at work or traveling around.

Figure 2:
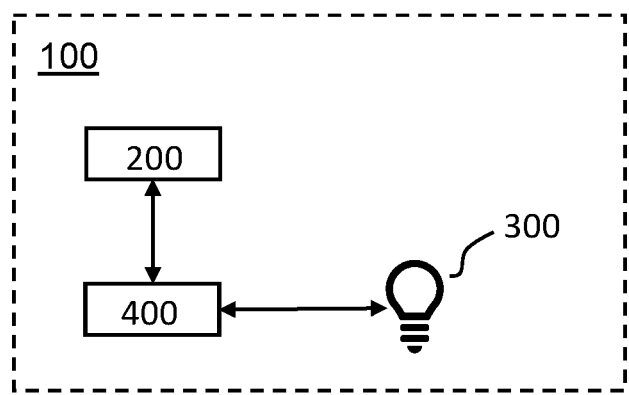
FIG. 2 schematically depicts example components of a subsystem as disclosed herein for controlling illumination via motion detection.

Example components of such a subsystem 100 as disclosed herein for controlling illumination via motion detection is schematically depicted in FIG. 2. The subsystem 100 comprises at least a radar sensor 200, a lighting device 300, and a controller 400. The controller is communicatively coupled to the radar sensor and the lighting device. With the knowledge of the detection area and the feedback from the lighting device about the state of the lamp, the controller is configured to set the sampling frequency of the radar sensor to an initial value below two times a first Nyquist frequency, when the lighting device is in a standby mode. And then based on sensor data obtained by the radar sensor at the specified sampling frequency, the controller is further configured to control the lighting device. The first Nyquist frequency is set to a first estimated maximum Doppler frequency of motion to be detected in the detection area by the radar sensor when the lighting device is in the standby mode. And hence, the radar sensor is operating in a sub-sampling mode when the lighting device is in the standby mode for power reduction.

Figure 3:
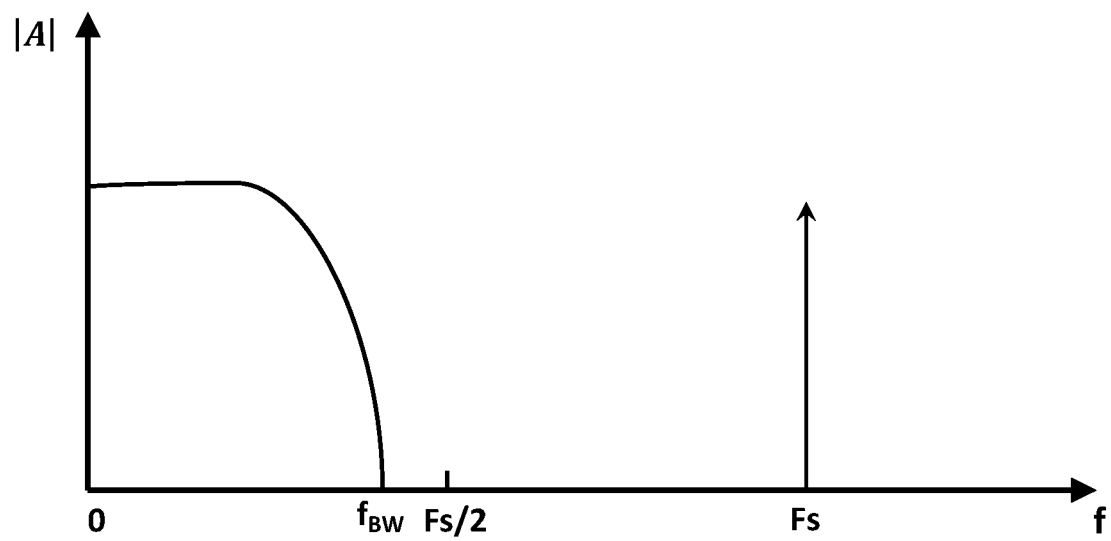
FIG. 3 illustrates the setting of a sampling frequency to fulfill the Nyquist sampling criterion for a given set of signals.

To get a better understanding of the concept of sampling in digital signal processing, FIG. 3 illustrates the setting of a sampling frequency to fulfill the Nyquist sampling criterion for a given set of signals. In this example, the set of signals is band-limited, and their frequency contents are concentrated below $f_{BW}$. According to the Nyquist sampling criterion, to avoid folding or aliasing, half of the sampling rate Fs/2 should not be small than the signal bandwidth $f_{BW}$. By definition, half of the sampling rate Fs/2 is also called the Nyquist frequency $F_{Ny}$. Therefore, to prevent aliasing, the sampling frequency is typically set according to $F_s = 2F_{Ny}$ and $F_{Ny} \geq f_{BW}$.

Figure 4:
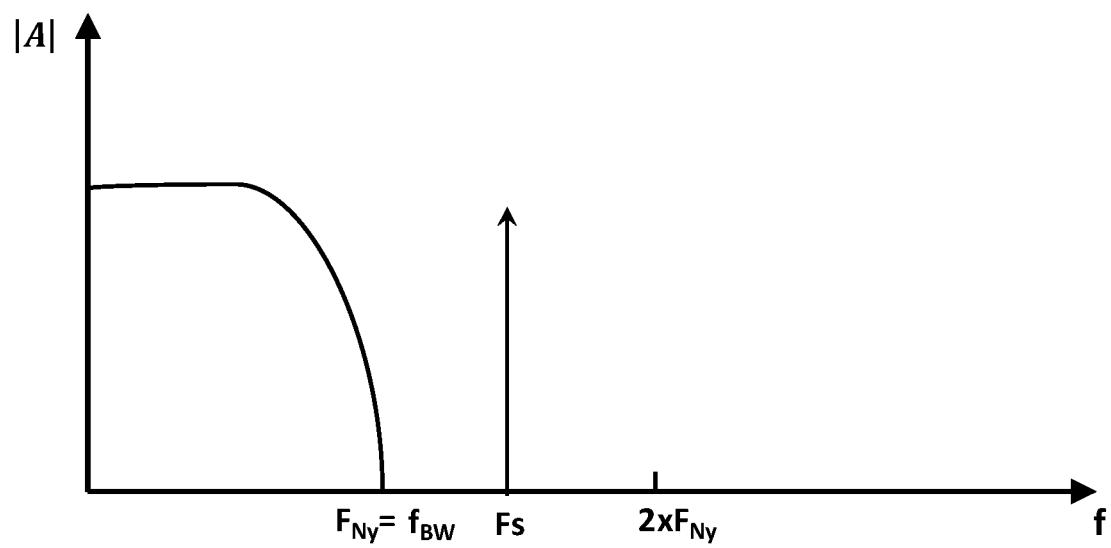
FIG. 4 shows the setting of a sampling frequency in a sub-sampling mode.

FIG. 4 shows the setting of a sampling frequency in a sub-sampling mode. Here $F_{Ny} = f_{BW}$ and $F_s < 2F_{Ny}$. The power consumption of the ADC and the following digital processing circuit are in proportion to the sampling frequency. Therefore, operating in a sub-sampling mode, the power consumption of the radar sensor is reduced accordingly.

Therefore, in order to configure the radar sensor to operate in a sub-sampling mode, the first step is to estimate the potential bandwidth of the signals. For a Doppler radar used for motion detection in this case, the signal bandwidth of the baseband signal is equivalent to the potential Doppler shifts to be detected. Although it can be quite complicated to precisely derive the actual Doppler shift, which depends on many factors related to the moving objects and also the environment, a rule of thumb estimation of the maximum Doppler shift can be made according to the detection area and the type of motions to be detected in the detection area. For example, for an indoor environment, it is typically assumed that the maximum walking speed of a person is below 3 m/s, or 10.8 km/h. For an outdoor environment, depending on the detection area, a typical maximum speed limit of a vehicle can be 130 km/h on a highway, or 50 km/h on a residential road. With the knowledge of the maximum speed of the motion to be detected for a certain detection area, the maximum Doppler shift of the motion to be detected in the detection area can be estimated by the subsystem, given the carrier frequency of the radar signals emitted by the radar sensor and the Doppler shift principle.

As an example, a 24 GHz Doppler radar is to be deployed to detect motion in an indoor environment. We can estimate the maximum Doppler shift to be detected by the radar sensor based on the following parameters:
 the maximum speed of motion, here the maximum indoor casual walking speed of a person ($\Delta v_{max}$): 3 m/s,
 the carrier frequency of the radar signals ($f_0$): 24 GHz and
 the speed of light speed (c): 3e8 m/s.
Using these parameters, we can compute a maximum Doppler shift:

$$\Delta f_{max} = \frac{\Delta v_{max}}{c} f_0 = 240 \text{ Hz} \qquad \text{(Eq. 1)}$$

Linking to the state of the lamp, a more accurate estimation of the maximum Doppler shift can be made. Typically, a certain state of the lamp, active or standby, also indicates if there is a person in the area or not. And hence, the motion to be detected by the radar sensor at the first moment when the lighting device is in a standby mode is typically big motions, such as a person walking into the room. In contrast, when the lighting device is in an active mode, which typically indicates there is a person already in the room, most of the time the radar sensor may only detect minor motions of the person, such as typing on a keyboard or talking on a phone, but the instantaneous speed can be even higher than the big body movement. Since the Doppler shifts and the amplitudes of the echoes resulted from big motions and minor motions can present quite different behaviors, a more accurate estimation of the first Nyquist frequency can be made by linking the state of the lighting device and the detection area. It reduces the chance that the sampling frequency is set unnecessarily high, and hence extra power consumption may be avoided.

Figure 5:
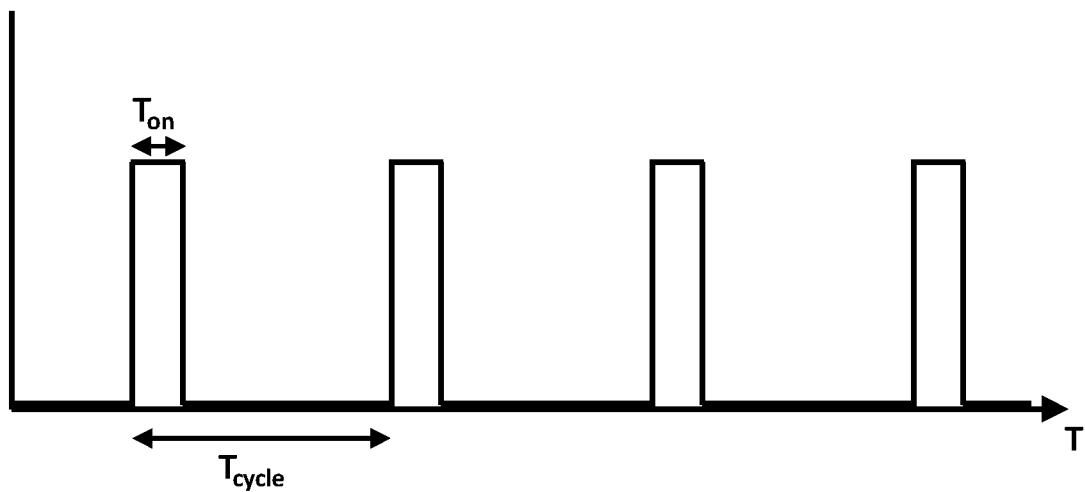
FIG. 5 illustrates power cycling control.

FIG. 5 illustrates power cycling control. As a commonly used technique for power saving, power cycling control is also widely used for radar detection system. The entire system is switched on and off alternately, and it is intended to keep the on-period $T_{on}$ as small as possible, as compared to the entire cycle $T_{cycle}$, for power reduction. The ratio between $T_{on}$ and $T_{cycle}$ is called the duty cycle. The sub-sampling operation can be used in combination with other power saving techniques for a radar sensor, such as power cycling. The AFE of the radar sensor can be subjected to duty cycling with a clock operating on the same frequency of the sampling clock, but with slightly phase shift, in order to guarantee a stable sampling operation of the radar sensor.

To give an example about how this can be implemented. The subsystem or the radar sensor further comprises a clock generation system. The clock generation system generates a sampling clock, or a first clock, according to the sampling frequency as specified by the controller. For the power cycling of the AFE of the radar sensor, the clock generation system may generate another clock from a first clock previously used to control the sampling frequency of the radar sensor, and the other clock operates at a same frequency as the sampling frequency but with a phase delay, and wherein the phase delay guarantees that the AFE part of the radar sensor is stabilized and ready for sampling. The newly generated other clock is applied to control the sampling frequency of the radar sensor; and the controller is further configured to power cycle the AFE of the radar sensor with the first clock. Note that the first clock is earlier in phase as compared to the other clock. Furthermore, the on-period $T_{on}$ of the AFE should be long enough to allow signals from the analog front-end part to be sampled properly in the ADC.

The combination of sub-sampling operation of the radar sensor and the power cycling of the AFE provides a further power reduction, as compared to the usage of any one of the two techniques on isolation.

Figure 6:
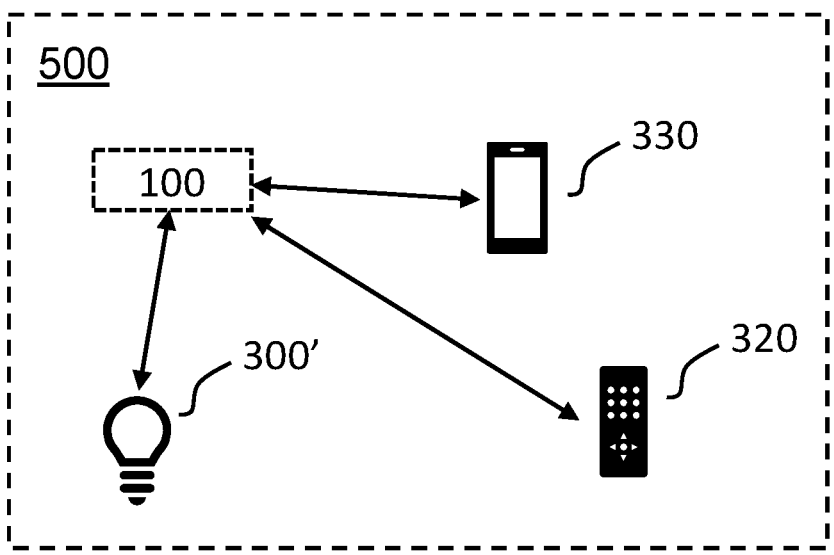
FIG. 6 shows a system for controlling illumination via motion detection.

FIG. 6 shows a system for controlling illumination via motion detection. The subsystem 100 is configured to generate a control signal to control the state change of the lighting device, such as to turn on the lamp when motion is detected, and to turn off the lamp when no motion is detected after a first predefined time period. Depending on the tradeoff between system energy efficiency and user experience, the first predefined time period can be configured to be relatively longer or shorter. In the event the first predefined time period is set too short, it might be very efficient from the energy-saving point of view, but it may result in a very bad user experience wherein the lamp is switched off because the user is sitting still for a while.

As already disclosed above, the system may further comprise a remote-control device or a smart electronic device belonging to a user. The same information related to motion detection can be shared wirelessly to those remote devices for different use cases. Different radio transceivers complying to different communication standards can be deployed, in both indoor and/or outdoor applications, to enable such a wireless link, such as 3G/4G/5G cellular, WiFi, Zigbee, BLE, Zwave, Thread and etc. In another example, the system may further comprise another lighting device, or even more than one other lighting device. Those lighting devices are controlled in a collective way. By employing the radar sensor in one subsystem and sharing the same motion detection information for the control of different products (directly by the subsystem or via the remote-control device) in the proximity may be a more cost-effective way to realize building automation.

Figure 7:
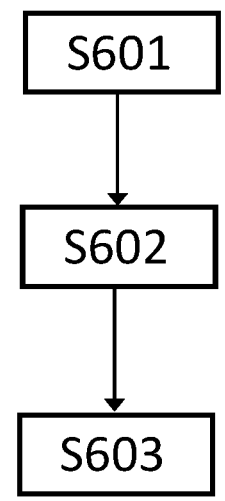
FIG. 7 shows a flow chart of the method for controlling illumination via motion detection.

FIG. 7 shows a flow chart of the method carried out by the subsystem for controlling illumination via motion detection. In step S601, the radar sensor 200 comprised in the subsystem is configured to detect motion in a detection area by sampling derived signals from the detection area at a sampling frequency. And in step S602, the controller comprised in the subsystem is configured to set the sampling frequency of the radar sensor when a lighting device is in a standby mode to an initial value below two times a first Nyquist frequency, and wherein the first Nyquist frequency is equal to a first estimated maximum Doppler frequency of motion to be detected in the detection area by the radar sensor 200 when the lighting device 300 is in the standby mode. In step S603, the controller is further configured to control the lighting device 300 based on sensor data obtained by the radar sensor 200 at the specified sampling frequency.

When motion is detected by the controller from sensor data obtained by the radar sensor in step S604, a control signal is generated in step S607 to trigger the lighting device 300 to change from the standby mode to an active mode.

Figure 8:
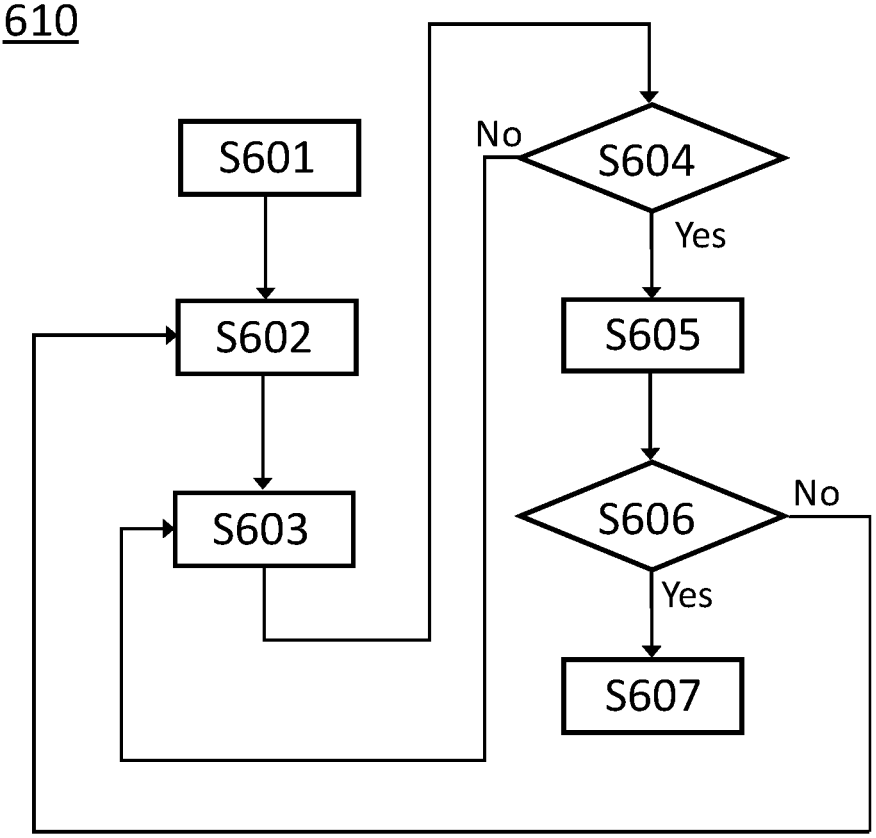
FIG. 8 shows a flow chart of the method for controlling illumination via motion detection with precaution for false positive.

When the radar sensor operates in a deep sub-sampling mode, the binary presence information is derived using an approach similar to energy detection, i.e. by detecting the energy in derived signals to be above a certain threshold, instead of retrieving the original doppler shift information. And hence, the false positive rate may be increased as compared to a normal operation. If the lighting device is turned on due to a false positive decision on the motion detection, it also introduce unwanted power consumption of the system. Therefore, it is disclosed to have a further step to reduce the possibility of false positive. FIG. 8 shows a flow chart of the method for controlling illumination via motion detection with precaution for false positive.

Instead of generating a control signal immediately when motion is detected in step S604, the controller will set the sampling frequency of the radar sensor to an increased value as compared to the initial value in step S605. If motion is confirmed by the new set of sensor data obtained by the radar sensor operating at the sampling frequency of the increased value in step S606, a control signal to trigger the state change of the lighting device will be generated in step S607; otherwise, the controller will decide that it is a false positive and reset the sampling frequency of the radar sensor back to the initial value in step S602 for power saving.

Although in most cases, only binary presence detection is expected for a radar sensor operating in a sub-sampling mode, where the sampling frequency is less than two times the Nyquist frequency. Sometimes, it is also desirable to still derive some more detailed motion information from the sub-sampling radar, such as the speed of the motion, the number of motion sources, and etc. Motion-related Doppler frequency signals may still be recovered from aliasing by sweeping the sampling frequency to several different discrete sampling frequencies below two times the first Nyquist frequency, and comparing subsampled outputs of sensor data sampled at each of the several different discrete sampling frequencies. Of course, this method will take longer time to derive wanted signals, and hence it turns out to be a trade-off between latency and power consumption.

For a practical example of the above whereby a tone is detected, it is assumed that the highest frequency tone is at 350 Hz or $f_{BW}$=350 Hz, and there are two discrete sampling frequencies set to $F_{s1}$=270 Hz and $F_{s2}$=330 Hz. According to the Fourier transform (FT) and operation of a sampling system, the actual tone at 350 Hz will appear at different locations after sampling. In case of $F_{s1}$=270 Hz, the actual tone at 350 Hz will appear at $|F_{s1}-f_{BW}|$=80 Hz. While in case of $F_{s2}$=330 Hz, the actual tone at 350 Hz will appear at $|F_{s2}-f_{BW}|$=20 Hz. Therefore, further processing can be employed to differentiate the original frequency bin from mirror frequencies, or to recover the original signal, by sweeping a set of discrete sampling frequencies in the sub-sampling region.

The method may further comprise steps of determining an operation mode of the radar sensor to be either a normal operation mode or a power saving mode according to a power supply condition when the lighting device is in the active mode. And then depending on the power supply condition, such as if it is powered by a DALI SR interface, or very strict power regulation is imposed, the controller can determine the operation mode of the radar sensor. And then, the sampling frequency of the radar sensor when the lighting device is in an active mode is set to at least two times a second Nyquist frequency for the normal operation mode, or below two times the second Nyquist frequency for the power saving mode, and wherein the second Nyquist frequency is set to a second estimated maximum Doppler frequency of motion to be detected in the detection area by the radar sensor when the lighting device is in the active mode.

Therefore, in a preferred setting, the radar sensor is in normal operation mode with sampling frequency satisfying the Nyquist sampling criterion. And then more reliable motion detection and more enriched details can be detected. The radar sensor may even operate in an over-sampling mode, with the sampling frequency much higher than two times the Nyquist sampling frequency, when power saving is less critical as compared to more advanced motion detection-based functionalities.

Using detailed motion detection based on Doppler analysis or micro-Doppler analysis, more sophisticated presence information can be derived. Such detailed motion information can enrich the lighting control to a more advanced level, such as to switch the lighting device to a certain lighting scene based on the classification of the motion. For example, if the motion detection derives that the person is lying on the sofa, the controller may send a control signal to trigger the lighting device to switch to a relaxing scene. In another example, if the motion detection derives that the person is playing video games, the controller may send another control signal to trigger the lighting device to switch to a stimulating scene by manipulating the light spectrum for a more advanced lighting control.

When the radar sensor is powered by a DALI SR interface and is sharing the same bus with several other sensors, it may be desirable for the radar sensor to stay in a power-saving mode. In that case, the sampling frequency of the radar sensor will be below two times the second Nyquist frequency in a sub-sampling mode. And then, the sampling frequency can be set slightly below two times the second Nyquist frequency, or further below two times the second Nyquist frequency, adaptively to the actual power supply condition.

In some circumstances, the second Nyquist frequency may be of the same value as the first Nyquist frequency, depending on the expected motions to be detected when the lighting device is in the standby mode and in the active mode.

The methods according to the invention may be implemented on a computer as a computer implemented method, on a general-purpose signal processor, using multiple processing units, or in dedicated hardware such as an FPGA or an ASIC, or in a combination of both.

Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred example, the computer program comprises computer program code means adapted to perform the steps of a method according to the invention when the computer program is run on a computer. Preferably, the computer program is embodied on a computer readable medium.

Methods, systems and computer-readable media (transitory and non-transitory) may also be provided to implement selected aspects of the above-described embodiments.

The term "controller" is used herein generally to describe various apparatus or subsystem relating to, among other functions, the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, solid state drives, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network. Furthermore, it should be readily appreciated that various networks of devices as discussed herein may employ one or more wireless, and or wire/cable links to facilitate information transport throughout the network.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified It should also be understood that, unless clearly indicated to the contrary, in any methods claimed herein that include more than one step or act, the order of the steps or acts of the method is not necessarily limited to the order in which the steps or acts of the method are recited. Also, reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases.

The invention claimed is:

1. A subsystem for controlling illumination of a lighting device via motion detection, the subsystem comprising:
   a radar sensor a configured to detect motion in a detection area by sampling derived signals from the detection area at a sampling frequency;

a controller communicatively coupled to the radar sensor and the lighting device, the controller configured to:
set the sampling frequency of the radar sensor when the lighting device is in a standby mode to an initial value below two times a first Nyquist frequency and
control the lighting device based on sensor data obtained by the radar sensor at the specified sampling frequency; and
wherein the first Nyquist frequency is set to a first estimated maximum Doppler frequency of motion to be detected in the detection area by the radar sensor when the lighting device is in the standby mode.

2. The subsystem of claim 1, wherein the initial value is below the first Nyquist frequency.

3. The subsystem of claim 1, wherein the controller is further configured to:
generate a control signal to trigger the lighting device to change from the standby mode to an active mode when motion is detected from sensor data obtained by the radar sensor.

4. The subsystem of claim 3, the subsystem comprising a wireless transceiver, and wherein the wireless transceiver is configured to:
transmit sensor data and/or the control signal wirelessly to at least one of: another lighting device, a remote-control device, and a smart electronic device belonging to a user.

5. A system for controlling illumination via motion detection, the system comprising:
a subsystem according to claim 1;
wherein the subsystem is configured to generate a control signal to:
trigger the lighting device to change from the standby mode to the active mode when motion is detected, and
trigger the lighting device to change from the active mode to the standby mode when no motion is detected after a first predefined time period.

6. The subsystem of claim 1, wherein the controller is further configured to:
determine an operation mode of the radar sensor to be either a normal operation mode or a power saving mode according to a power supply condition when the lighting device is in the active mode,
set the sampling frequency of the radar sensor when the lighting device is in the active mode to:
at least two times a second Nyquist frequency for the normal operation mode and
below two times the second Nyquist frequency for the power saving mode, and
wherein the second Nyquist frequency is set to a second estimated maximum Doppler frequency of motion to be detected in the detection area by the radar sensor when the lighting device is in the active mode.

7. The subsystem of claim 1, wherein the controller is further configured to:
derive detailed motion information via Doppler analysis based on samples of sensor data obtained by the radar sensor when motion is detected, and wherein the detailed motion information includes at least one of: a number of motion sources, a moving direction of a motion source relative to the radar sensor, velocity of the motion, and classification of the motion; and
control the lighting device in a more advanced mode according to the detailed motion information.

8. The subsystem of claim 1, wherein the radar sensor further comprises:
an analog front-end, AFE, arranged to be separately powered on and off from the rest of the radar sensor; and
the controller further configured to:
control the power cycle of the AFE of the radar sensor with the same frequency as the sampling frequency by turning on the AFE before a sampling moment for the radar sensor to take a sample and turning off the AFE once the sample is taken.

9. A method for controlling illumination of a lighting device via motion detection, the method comprising:
detecting motion in a detection area by a radar sensor, the radar sensor sampling derived signals from the detection area at a sampling frequency;
setting the sampling frequency of the radar sensor when a lighting device is in a standby mode to an initial value below two times a first Nyquist frequency, and wherein the first Nyquist frequency is equal to a first estimated maximum Doppler frequency of motion to be detected in the detection area by the radar sensor when the lighting device is in the standby mode; and
controlling the lighting device based on sensor data obtained by the radar sensor at the specified sampling frequency.

10. The method of claim 9, the method further comprising:
generating a control signal to trigger the lighting device to change from the standby mode to an active mode when motion is detected from sensor data obtained by the radar sensor.

11. The method of claim 9, the method further comprising:
setting the sampling frequency of the radar sensor when the lighting device is in the standby mode to an increased value as compared to the initial value when a motion is detected from sensor data obtained by the radar sensor;
generating a control signal to trigger the lighting device to change from the standby mode to the active mode when the detection of motion is confirmed from a new set of sensor data obtained by the radar sensor operating at the sampling frequency of the increased value; and
setting the sampling frequency back to the initial value when the detection of motion is not confirmed from the new set of sensor data obtained by the radar sensor operating at the sampling frequency of the increased value.

12. The method of claim 9, the method further comprising:
sweeping the sampling frequency when the lighting device is in the standby mode to several different discrete sampling frequencies below two times the first Nyquist frequency, and setting the sampling frequency to each of the several different discrete sampling frequencies for a second predefined time period to enable a stable detection by the radar sensor; and
recovering motion-related Doppler frequency signals from aliasing, by comparing a set of subsampled outputs of sensor data obtained by the radar sensor sampled at each of the several different discrete sampling frequencies.

13. The method of claim 9, the method further comprising:
determining an operation mode of the radar sensor to be either a normal operation mode or a power saving mode according to a power supply condition when the lighting device is in the active mode; and setting the sampling frequency of the radar sensor when the lighting device is in the active mode to:
  at least two times a second Nyquist frequency for the normal operation mode, and
  below two times the second Nyquist frequency for the power saving mode, and
wherein the second Nyquist frequency is set to a second estimated maximum Doppler frequency of motion to be detected in the detection area by the radar sensor when the lighting device is in the active mode.

14. The method of claim 9, the method further comprising:
  deriving detailed motion information via Doppler analysis based on sampled outputs of sensor data obtained by the radar sensor when motion is detected, and wherein the detailed motion information includes at least one of: a number of motion sources, a moving direction of a motion source relative to the radar sensor, velocity of the motion, and classification of the motion; and
  controlling the lighting device in a more advanced mode according to the detailed motion information.

15. A non-transitory computer readable medium comprising instructions which, when the instructions are executed by a computer, cause the computer to carry out:
  receiving samples from a radar sensor detecting motion in a detection area of the radar sensor, the radar sensor sampling derived signals from the detection area at a sampling frequency;
  setting the sampling frequency of the radar sensor when a lighting device is in a standby mode to an initial value below two times a first Nyquist frequency, and wherein the first Nyquist frequency is equal to a first estimated maximum Doppler frequency of motion to be detected in the detection area by the radar sensor when the lighting device is in the standby mode; and
  controlling the lighting device based on sensor data obtained by the radar sensor at the specified sampling frequency.

* * * * *